US008355402B2

(12) United States Patent
Chion et al.

(10) Patent No.: US 8,355,402 B2
(45) Date of Patent: Jan. 15, 2013

(54) ENHANCEMENT OF PATH QUALITY OF SERVICE IN MULTI-HOP PACKET COMMUNICATION NETWORKS

(75) Inventors: Hua Mary Chion, Belle Mead, NJ (US); Jerry Pak Lup Chow, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 611 days.

(21) Appl. No.: 12/210,973

(22) Filed: Sep. 15, 2008

(65) Prior Publication Data

US 2009/0147731 A1 Jun. 11, 2009

Related U.S. Application Data

(60) Provisional application No. 60/972,745, filed on Sep. 14, 2007.

(51) Int. Cl.
*H04L 12/28* (2006.01)

(52) U.S. Cl. .................. 370/395.21; 370/238
(58) Field of Classification Search .............. 370/235, 370/315, 389, 338
See application file for complete search history.

(56) References Cited

U.S. PATENT DOCUMENTS

| | | | | |
|---|---|---|---|---|
| 7,177,295 B1 * | 2/2007 | Sholander et al. | ............. | 370/338 |
| 2002/0101822 A1 * | 8/2002 | Ayyagari et al. | ............... | 370/235 |
| 2007/0217406 A1 * | 9/2007 | Riedel et al. | ................... | 370/389 |
| 2009/0003260 A1 * | 1/2009 | Guo et al. | ...................... | 370/315 |
| 2009/0219853 A1 * | 9/2009 | Hart et al. | ...................... | 370/315 |

* cited by examiner

*Primary Examiner* — Andrew Lai
*Assistant Examiner* — Syed M Bokhari
(74) *Attorney, Agent, or Firm* — Perkins Coie LLP

(57) ABSTRACT

Techniques and systems for enhancing quality of service (QoS) in communication networks, including wired and wireless communication networks. Implementations of described techniques and systems can be used to provide path-based QoS with distributed per-hop scheduling for carrying traffic over a multi-hop packet communication network.

14 Claims, 5 Drawing Sheets

Example of Wireless Mobile Relay Access Network

Example of Wireless Mobile Relay Access Network

ENHANCEMENT OF PATH QUALITY OF SERVICE IN MULTI-HOP PACKET COMMUNICATION NETWORKS

PRIORITY CLAIM

This document claims the benefit of U.S. Provisional Application No. 60/972,745 entitled "PATH QOS IN WIRELESS RELAY NETWORK" and filed by Jerry Pak Lup Chow and Hua Mary Chion on Sep. 14, 2007, which is incorporated by reference as part of the disclosure of this document.

BACKGROUND

This document relates to quality of service (QoS) in communication networks and systems, including wired and wireless communication networks and systems.

Communication networks, wireless or wired, are networks of communication nodes and operate to deliver information or data from one node to another node. Such delivery is frequently accomplished by hoping through one or more intermediate nodes in order to send the information or data from the sending node to the destination node. For a given path from the sending node via one or more intermediate nodes to the destination node, it can be technically challenge to ensure the quality of service (QoS) at the destination node due to various factors that affect the delivery of the information or data. QoS can be characterized by various QoS parameters or metrics. Examples of QoS metrics include the time delays in data transmission, jitters of the arrival times of the data packets, the number of dropped packets, errors in delivered data, and out-of-order delivery. Enhancing QoS and maintaining QoS at a certain desired level are among the major issues in designing and deploying wired and wireless communication networks and various services through such networks.

Wireless communication systems use a network of base stations to communicate with wireless devices registered for services in the systems. The base stations, which conceptually locate at the center of respective cells of wireless radio coverage, transmit information to respective mobile stations (MSs) registered in the network, which are also referred to as subscriber stations (SSs), via respective downlink (DL) radio signals sent out from the base stations. The mobile stations transmit information to their serving base stations via uplink (UL) radio signals. Each base station emits radio signals that carry data such as voice data and other data content to wireless devices. Such a signal from a base station can include overhead load for various communication management functions, including information to allow a wireless device to identify a cell sector of a base station, to synchronize signaling in time and frequency. Each wireless device processes such information in the overhead load of each received signal prior to processing of the data. OFDM and OFDMA systems are examples of wireless communications and are based on orthogonality of frequencies of multiple subcarriers to achieve a number of technical advantages for wideband wireless communications, such as resistance to multipath fading and interference.

The radio coverage of a wireless network of fixed base stations may be limited due to various factors. Certain structures in an intended service area may block the radio signals of one or more base stations. For example, a tall building may shield a particular area from the radio signal from a base station, thus creating an undesired shadowing. At the edge of a radio cell, the signal strength can be weak and hence can increase the error rate in the wireless communications. One approach to mitigating these and other limitations is to increase the number of base stations in a given service area. In one implementation under this approach, one or more relay stations (RSs) can be deployed among certain fixed base stations to relay communication signals between a subscriber station and a base station, thus extending the coverage and improving the communication capacity and quality of the base station. A relay station may be a fixed transceiver or a mobile transceiver station depending on the specific conditions for deploying such as relay station. A subscriber station signal may hop through one or more RSs before reaching a serving base station. Multi-hop Relay (MR) modes can be provided to use relay stations for enhanced coverage and service to subscribers. For example, a multi-hop relay wireless network under IEEE 802.16j includes MR base stations (MR-BSs) and relay stations (RSs).

Effective QoS mechanisms are desirable in such multi-hop relay networks and other multi-hop networks to provide high quality delivery of data and services to subscribers.

SUMMARY

This document provides techniques and systems for enhancing quality of service (QoS) in communication networks, including wired and wireless communication networks. Implementations of described techniques and systems can be used to provide path-based QoS with distributed per-hop scheduling for carrying traffic over a multi-hop packet communication network.

In one aspect, a method for enhancing quality of service (QoS) in a multi-hop communication network under a distributed scheduling includes determining a unused portion of a delay in transmitting each of data packets at nodes of a multi-hop path; attaching to the data packets information on unused portions of delays in transmitting the data packets obtained at one node to transmit both the data packets and the information on the unused portions of delays to the next downstream node along the multi-hop path; and scheduling transmission of the data packets in the next downstream node further along the multi-hop path based on the unused portions of delays that are respectively associated with the data packets. The amount of delay for transmitting a data packet is extended by a respective received unused portion of delay associated with the data packet.

In another aspect, a multi-hop communication network for forwarding data packets under a distributed scheduling includes communication nodes linked to forward data packets from one node to another node under a distributed scheduling. In this network, each node includes data queues that receive and store data packets from a upstream node along a multi-hop path. Each data queue processes a received data packet to extract information on a unused portion of a per-hop quality of service (QoS) parameter indicating QoS of the multi-hop path. Each node also includes a data packet scheduler that reads the information on each unused portion of the per-hop QoS parameter, requests link resource for transmission the data packets in the data queues, schedules transmission of the data packets based on availability of the requested link resource and information on unused portions of the per-hop QoS parameter associated with the data packets. A data packet transmitter is further included in each node. This transmitter is responsive to a scheduling decision from the data packet scheduler on a schedule for transmission of the data packets in the data queues along the multi-hop path and fetching the data packets from the data queues base don the schedule to transmit the fetched data packets to the next downstream node along the multi-hop path.

In yet another aspect, a method for enhancing quality of service (QoS) in a multi-hop communication network under a distributed scheduling includes determining unused portions of per-hop QoS metric values in transmitting data in nodes of a multi-hop path; communicating information on unused portions of per-hop QoS metric values in transmitting data obtained at one node to the next downstream node along the multi-hop path; and allowing at least part of the unused portions of per-hop QoS metric values to be used by the next downstream node in data transmission to enhance QoS in the multi-hop path.

Additional aspects include a method to allow unused portions of per-hop QoS metric values to be communicated to and used by the next node along a multi-hop packet forwarding path between a source node of a Protocol Data Unit (PDU) to its destination node. This method may include an in-band signaling that contains the values of any unused portions of applicable per-hop QoS metrics, such as delay, or a PDU being forwarded. This method may include calculation of unused portions of applicable QoS metric values supported by the in-band signaling after the PDU is scheduled for transmission. Adding information on the values of any unused portions of applicable per-hop QoS metrics as in-band signaling to the PDU may be made after the PDU has been scheduled for transmission and before the PDU is sent to the next node along the path. This method may include using an intermediate forwarding node to receive the in-band signaling in a PDU from an upstream node and to calculate new values for those QoS metrics with corresponding values contained in the in-band signaling for transmitting the PDU to a downstream node. In addition, the calculation of a new metric value for the PDU is in the range of the existing assigned per-hop QoS metric value to the assigned per-hop QoS metric value plus the corresponding headroom value in the received in-band signaling. The newly calculated metric values for the scheduling of the PDU for transmission are applied to the next node on the path.

These and other aspects, along with various associated technical features, are described in detail in the drawings, the description and the claims.

DETAILED DESCRIPTION

Techniques and systems described in this document provide path-based QoS with distributed per-hop scheduling for carrying traffic over a multi-hop packet communication network, such as a wireless relay network and a wired relay network. An example for such a wireless relay network is a wireless communication network under IEEE 802.16. An example for such a wired relay network is a computer network of computers or computer servers. Such a multi-hop packet communication network can include nodes for forward packets in the network based on distributed per-hop scheduling and support parameterized per-hop QoS.

The following examples use wireless relay networks to illustrate features of the present techniques and systems for providing QoS mechanisms that enhance QoS in multi-hop packet forwarding communications.

Figure 1:
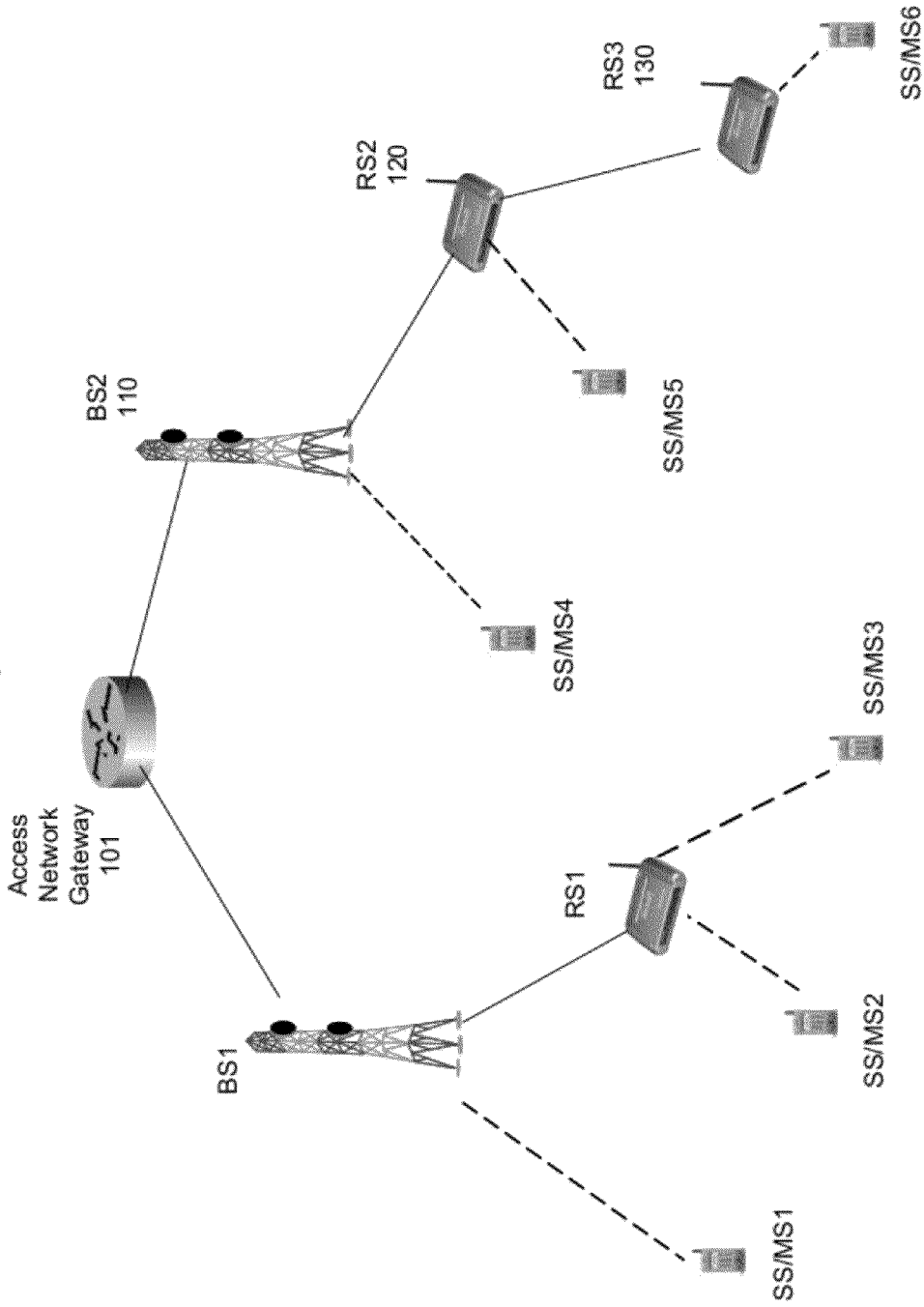
FIG. 1 shows an example of a wireless relay access network.

FIG. 1 shows an example of a wireless multi-hop relay access network that includes network elements such as base stations and relay stations to wirelessly communicate with mobile stations. A relay station can be fixed, nomadic or mobile. The wireless relay access network can be configured to support data transmission between BS and MS either directly or through one or more RSs. As an example, IEEE 802.16j defines an air interface standard for a wireless relay access network based on OFDMA technology and this air interface can be implemented in the network in FIG. 1.

The exemplary network in FIG. 1 is shown to include an access network gateway 101 connected to base stations, such as two exemplary base stations BS1 102 and BS2 110, to control the operations of the base stations and to provide a gateway to other networks such as one or more IP networks, the public switched telephone network (PSTN) and others. Relay stations (e.g., RS1, RS2 and RS3) that are subordinate to their respective base stations are also provided in this network to expand the radio coverage of certain base stations. Mobile stations (e.g., MS1-MS6) can access the network by directly wirelessly accessing a base station (e.g., MS1 and MS4) or by wirelessly accessing one or more relay stations connected to the base station (e.g., MS3 and MS6). Notably, the relay stations RS2 120 and RS3 130 are connected to the gateway 101 via the base station BS2 110 and thus form a multi-hop path for a mobile station (e.g., MS6) accessing the relay station 130. The QoS in such a multi-hop path, either from the mobile station MS6 to the base station BS2110 (i.e., the uplink for MS6) or from the base station BS2 110 to the mobile station MS6 (i.e., the downlink for MS6), can be enhanced by implementing QoS monitoring and controlling of one or more QoS metrics at each node in the multi-hop path under a distributed scheduling scheme.

In the network in FIG. 1, traffic store and forwarding occur at each intermediate RS on a multi-hop relay path. Required support for QoS within the wireless network means that QoS forwarding occurs at each hop. QoS traffic scheduling can be centralized (e.g. at the BS) or distributed at each of the RSs. Required QoS is generally on an end-to-end basis, which implies that QoS based on path metrics is most appropriate. Path-based QoS can be achieved with centralized scheduling because the centralized scheduler controls QoS behavior at each hop in the path in order to satisfy the path requirements. However, the centralized scheduling does not scale well to larger networks with longer paths. This is in part due to the high signaling overhead (to provide schedule control to each of the nodes being controlled) and scheduling delays caused by signaling delays to provide control to nodes over multiple hops.

Distributed traffic scheduling can be implemented in the multi-hop network like the wireless network example in FIG. 1 or in other configurations to provide more efficient and timely scheduling of the traffic in a larger network with multiple hops. The distributed scheduling can be designed in a way that each forwarding node can be assigned QoS metrics to satisfy for each traffic stream on the immediate hop(s) onto which the forwarding node controls the transmission of traffic. Due to the required translation of intrinsic path metrics to a series of per-hop metrics, some metrics end up being more constrained on a per-hop basis than if the metric were applied on a path basis. One example of this type of QoS metric is traffic delay, where the allowed path delay needs to be subdivided to a number of per-hop delays—each scheduler on the path ends up with perhaps a tighter delay constraint to satisfy than if it had some knowledge of the path delay budget remaining unused.

Path metric allocation to per-hop metric for distributed scheduling can, in one implementation, include the following features. For QoS metrics that are cumulative over hops of a multi-hop path, the path metric can be subdivided into per-hop metrics which are assigned to each hop. In this regard, the traffic delay is a commonly occurring cumulative QoS metric. Usually allocation of values for per-hop metrics from path metric is done by a centralized management entity with the knowledge of network topology and QoS requirements for traffic traversing the network. Once al located, each hop schedules packet forwarding according to the value of the metric that has been assigned to it and cannot take advantage of unused permissible delay from one or more upstream hops which do not fully utilize their allocations of the metric (e.g. for a particular packet being sent, one or more hops may have been able to schedule this packet earlier than their allotted maximum per-hop delay). This inability to use the slack in a QoS metric of another hop along the path doesn't allow the total allowance for the metric along the path to be fully exploited, which can result in loss of capacity along the path.

In recognition of the above and other technical issues, implementations of a QoS mechanism are provided in this document to allow cumulative QoS metrics along a multi-hop communication path comprising multiple hops to be more effectively utilized while minimizing the signaling overhead. Such QoS mechanism can be configured to allow unused portions of cumulative metrics of a node along the communications path to be made available to nodes further along the path to the destination and to support the communication of these unused portions of cumulative metrics while minimizing the signaling overhead.

As a specific example, consider the multi-hop relay path between the BS2 110 and the mobile station MS 6 as shown in FIG. 1. As a prerequisite, assume each RS node on the path has been configured to provide a certain QoS for Protocol Data Units (PDUs) belonging to a given stream of traffic. The QoS parameters include those which are cumulative along the path, such as the maximum delay for the path. For such cumulative QoS parameter, each RS has been apportioned a part of the total value of the parameter for the path to be used as its governing per-hop value for that metric. The examples below use the maximum delay of a multi-hop path as one example for the cumulative QoS metric. The techniques and systems for enhancing QoS described in this document can be applied to a different QoS metric which is or tends to be cumulative along the path.

Figure 2:
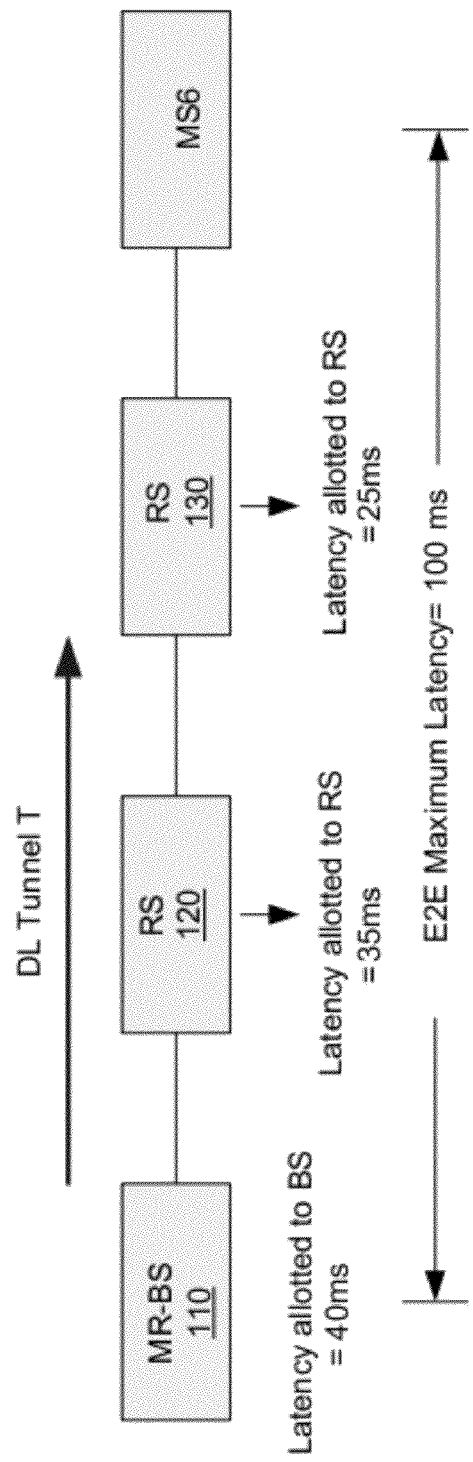
FIG. 2 illustrates an exemplary situation in the downlink tunnel from the base station to the mobile station in the network in FIG. 1.

FIG. 2 illustrates an exemplary situation in the downlink tunnel from the base station BS2 110 to the mobile station MS6 that accesses the relay station RS3 130 in the network in FIG. 1. The DL tunnel T is established from the multi-hop base station MR-BS 110 to the relay station RS3 130 through the intermediate relay station RS2 120 and is used to carry downlink data traffic from BS 110 to MS6. Consider a specific example where the maximum latency for this tunnel is 100 ms and MR-BS 110 has up to 40 ms to perform its scheduling and allocates a delay up to 35 ms to the immediate relay station RS 120 and a delay up to 25 ms to the relay station RS 130 based on the path topology and the current loading. If MR-BS 110 performs scheduling for the relay link to RS 120 and MR-BS 110 transmits the relay MAC PDU in only 20 ms, prior to the latency deadline of 40 ms, the MR-BS 110 has a 20-ms unused delay or an extra "headroom." This unused delay or headroom can be distributed to downstream nodes.

As an example, the MR-BS 110 can attach a special subheader "QoS Headroom extended subheader" to relay MAC PDU before transmitting to RS 120 with the value of the headroom set to 20 ms. When RS 120 receives the relay MAC PDU, RS 120 may add the extra 20-ms headroom from MR-BS 110 to its total allowed latency at this time (35 ms). RS 120 may determine the amount of headroom can be used by itself based on other QoS constrains such as the jitter. If RS 120 adds the entire headroom of 20 ms received from the MR-BS 110 to its allowed latency, the RS 120 now needs to schedule the relay MAC PDU within 55 ms instead of 35 ms. The same operations can be repeated at downstream nodes, e.g., RS 120 and RS 130 in this example where RS 130 can receive the headroom from RS 120. Hence, if RS 120 does not use up the 55-ms headroom, it can inform the downstream relay station RS 130 and RS 130 can use this extra headroom in scheduling its transmission to the mobile station MS 6.

The above example in FIG. 2 is a specific example of a path QoS management based on per-hop QoS scheduling. A subheader is provided in the PDU to communicate information on availability of additional allocation of a QoS metric value that is not used by one or more upstream nodes (the QoS Headroom). Various aspects of this path QoS management based on per-hop QoS scheduling are now described.

Figure 3:
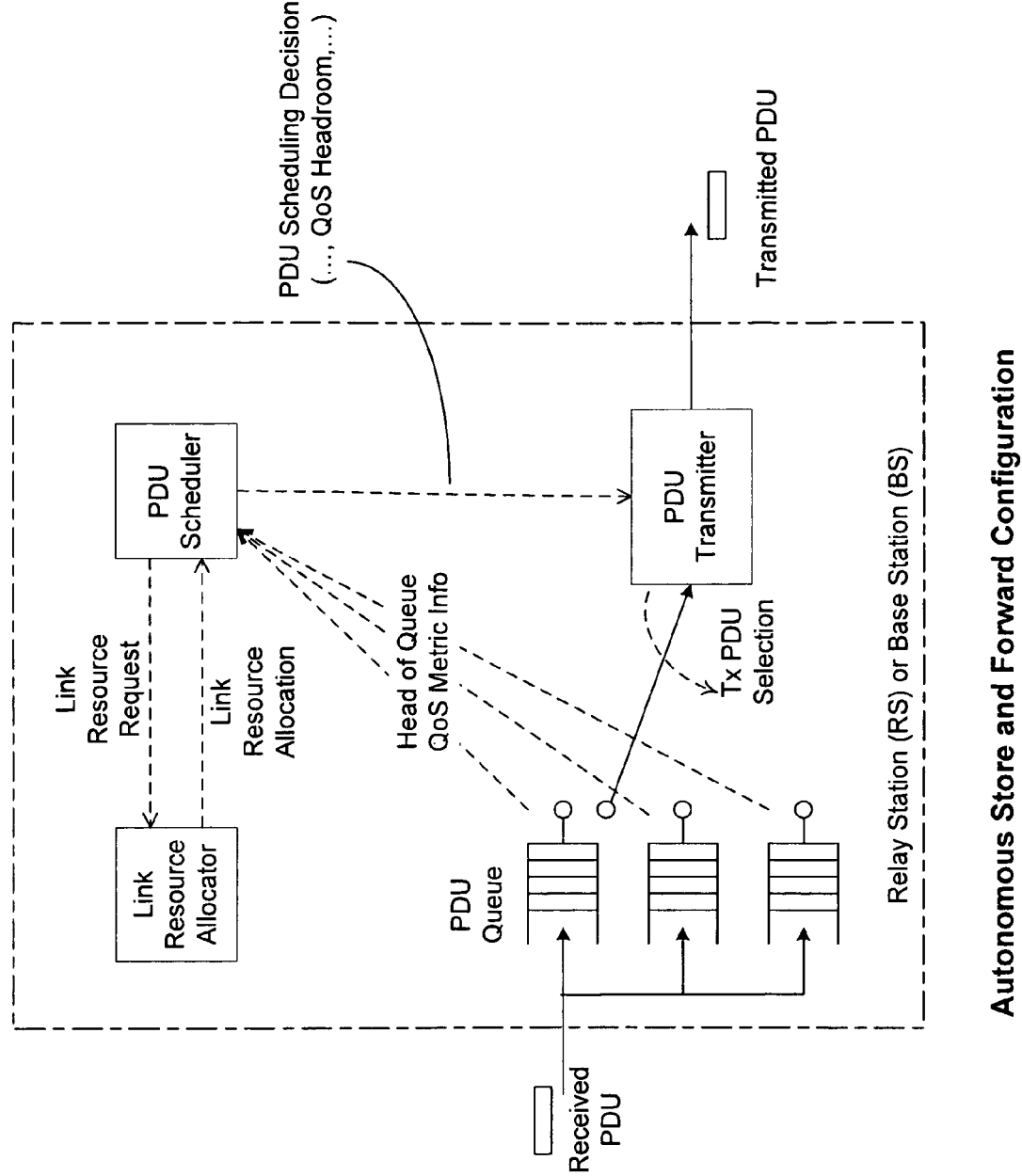
FIGS. 3 and 4 show examples of two different link resource control configurations between adjacent network nodes.
Figure 4:
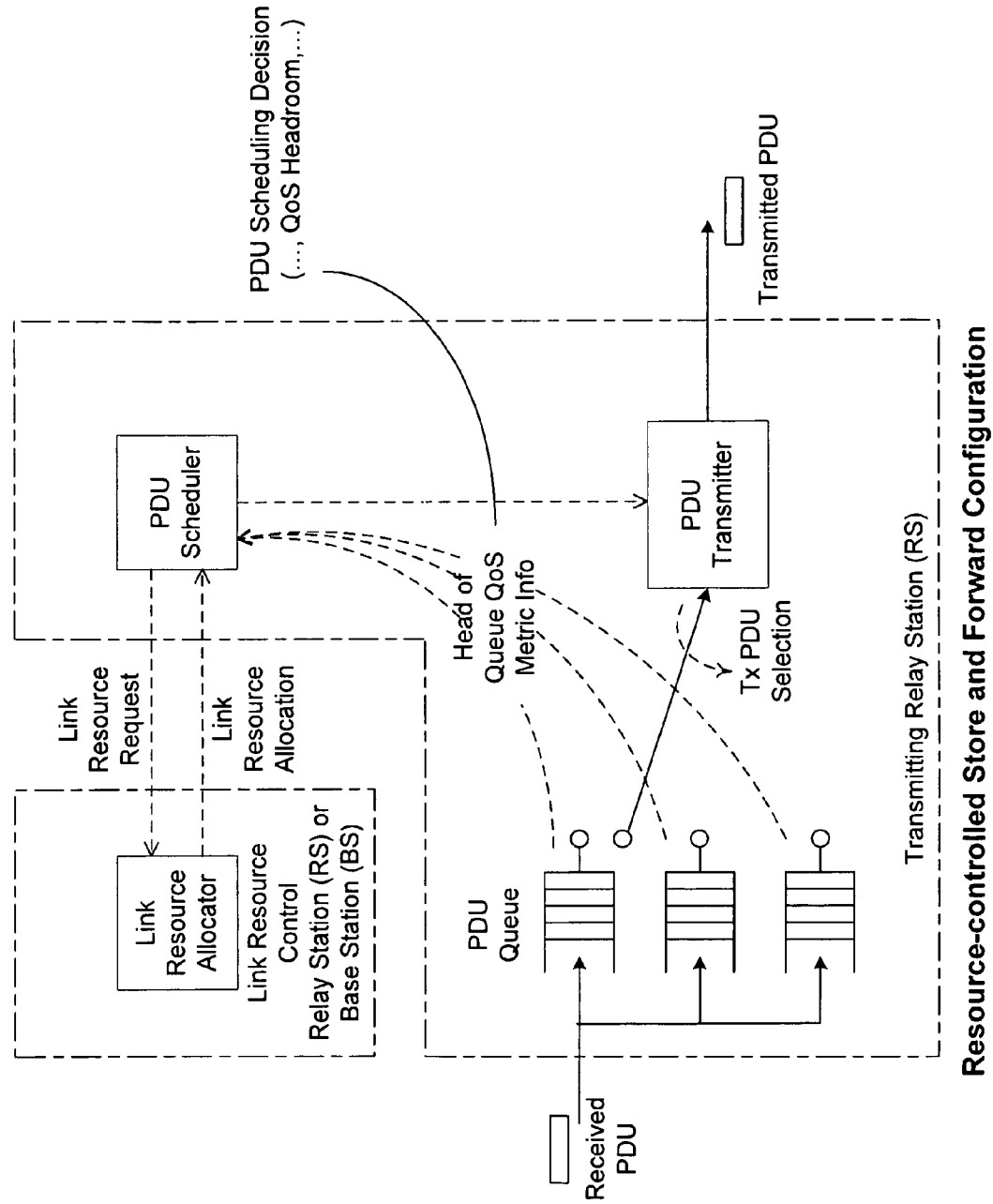

One technical issue associated with the QoS is link resource allocation in the distributed scheduling in a multi-hop path. FIGS. 3 and 4 show examples of two different link resource control configurations between adjacent network nodes (RSs or BSs).

FIG. 3 shows an example of the first link resource control configuration as an Autonomous Store-and-Forward node in which the transmitting node is in an autonomous mode that fully controls the resource allocations and the timing of transmissions on the link. An example of this autonomous mode of link resource control is in the downlink direction from the BS 110 to MS6 in the wireless relay network of FIG. 1. As shown in FIG. 3, a base station or relay station in this autonomous mode includes data queues such as PDU queue units to receive PDUs, a data packet scheduler such as a PDU scheduler that controls and schedules the transmission of data packets in the data queues, a link resource allocator that allocates link resource for the PDU transmission per request from the PDU scheduler and a PDU transmitter under control of the PDU scheduler to fetch PDUs in the queues to transmit per the local scheduling. These modules can be implemented as hardware circuits or software modules.

In operation, a PDU is received from the incoming link into the Autonomous Store-and-Forward node and the received PDU may include QoS Headroom information from the upstream node. The QoS Headroom information, if present, is extracted and processed upon reception by the PDU queues. The PDU queues use QoS Headroom information to update the relevant cumulative QoS metric. PDUs are associated with a particular PDU queue by virtue of sharing a common set of QoS metric requirements, such as belonging to the same connection. This updated QoS metric value in the PDU is now associated with the PDU as it is placed in its associated PDU queue awaiting transmission. Next, the PDU Scheduler makes decisions about the order in which PDU Queues are serviced for transmission and the available link resource that will be used to transmit a particular PDU. In making these scheduling decisions, the PDU Scheduler reads the QoS metric information associated with each PDU at the head of each PDU queue.

Based on the amount of information that needs to be transmitted for each PDU, the PDU Scheduler makes a request for sufficient link resources on the transmission link and sends this request to the link resource allocator. Upon receiving the request, the Link Resource Allocator fulfills the request for link resources based on the link availability and conditions and provides the PDU Scheduler with a link resource allocation of sufficient size at earliest availability. After receiving the link resource allocation, the PDU Scheduler instructs the PDU Transmitter to select the PDU at the head of a particular PDU Queue to be transmitted at a particular time by using particular transmission link resources at that time. When instructing the PDU Transmitter, the PDU Scheduler has sufficient information to determine whether the QoS Headroom remains for the PDU and if so, instructs the PDU Transmitter to add the QoS Headroom information to the PDU before the PDU is sent to the next store-and-forward node on the transmission path.

For each Protocol Data Unit (PDU) that traverses the path in the downlink direction (i.e. from BS to MS), each forwarding node (i.e. RS or BS) can track the delay of the PDU, the time PDU received by the RS or BS until the time PDU is transmitted from the node to the next node. Upon receiving the PDU from the upstream node, RS may have also received in-band signaling attached to the PDU, i.e. part of PDU header or subheader, containing the cumulated headroom in path delay due to upstream nodes along the path. If no such in-band signaling is attached, RS assumes that there is no extra headroom available from the upstream nodes. If such in-band signaling is attached, the RS applies that headroom to adjust the value of the QoS metric for that PDU.

Next, the PDU scheduler in the RS determines whether the available headroom from upstream can be fully exploited by the node. The decision can depend on whether this QoS metric is further constrained by another related QoS metric (for example, the maximum setting of delay metric may be constrained by the allowable jitter to avoid large variation in delay for PDUs in this stream). When PDU is transmitted, the PDU scheduler in the RS or BS determines whether there is any remaining headroom to be conveyed downstream. In one implementation, this assessment may be performed only if the next node on the path is not the final destination of the PDU (e.g. the MS). If the headroom is available and the amount of the headroom is compared to a headroom threshold that is set as a lower limit of the usable amount of the headroom. If the headroom is at or exceeds the headroom threshold, the PDU transmitter in the RS can append in-band signaling containing the remaining headroom information to the PDU so that this headroom can be used by the next downstream forwarding node. If not, then no such in-band signaling is added.

The above procedure can be applied at the BS and at each intermediate RS in the downlink forwarding path from BS to MS.

FIG. 4 shows the second link resource control configuration in which the allocation of resources on the link is performed by a separate network node from the transmitting node. This type of link resource control configuration can be used in a centrally controlled multiple access scheme, such as in the uplink direction (i.e. from MS to BS) in the wireless relay network of FIG. 1. In this uplink direction, the resource allocations for transmissions from a downstream node to the next upstream node are controlled by the upstream node. As illustrated in FIG. 4, the transmitting node in this configuration is different from the node in FIG. 3 in that the link resource allocator is in a separate node while other modules remain the same. The operation of the Resource-controlled Store-and-Forward Configuration of FIG. 4 is identical to that of the Autonomous Store-and-Forward Configuration of FIG. 4 with the exception that the Link Resource Allocator resides in a different node from the Store-and-Forward node and therefore, the PDU Scheduler needs to communicate with the separate node where the Link Resource Allocator for the transmission link resides in order to request link resources for the PDU transmissions.

Hence, for each Protocol Data Unit (PDU) that traverses the path in the uplink direction (i.e. from MS to BS), each forwarding node (i.e. RS) can track the delay of the PDU, the time PDU received by the RS until the time PDU is transmitted from the node. Upon receiving the PDU from the downstream node, RS may have also received in-band signaling attached to the PDU, i.e. part of PDU header or subheader, containing the cumulated headroom in path delay due to downstream nodes along the path. If no such in-band signaling is attached, RS assumes that there is no extra headroom available from the downstream nodes. If such in-band signaling is attached, the RS applies that headroom to adjust the value of the QoS metric for that PDU.

Next, the PDU scheduler in the RS determines whether the available headroom from downstream can be fully exploited by the node. The decision can depend on whether this QoS metric is further constrained by another related QoS metric (for example, the maximum setting of delay metric may be constrained by the allowable jitter to avoid large variation in delay for PDUs in this stream). The PDU scheduler makes timely requests for link resources from the Link Resource Allocator located in the next upstream node in order to satisfy the delay/jitter and bandwidth requirements of the queued PDUs. The PDU scheduler makes its scheduling decisions based on the resource allocations received from the Link Resource Allocator and the possibly updated QoS metrics of the PDUs queued and awaiting transmission upstream. When PDU is transmitted, the PDU scheduler in the RS or BS determines whether there is any remaining headroom to be conveyed upstream. In one implementation; this assessment may be performed only if the next node on the path is not the final destination of the PDU (e.g. the BS). If the headroom is available and the amount of the headroom is compared to a headroom threshold that is set as a lower limit of the usable amount of the headroom. If the headroom is at or exceeds the headroom threshold, the PDU transmitter in the RS can append in-band signaling containing the remaining headroom information to the PDU so that this headroom can be used by the next upstream forwarding node. If not, then no such in-band signaling is added.

The above procedure can be applied at each RS in the uplink forwarding path from MS to BS.

Figure 5:
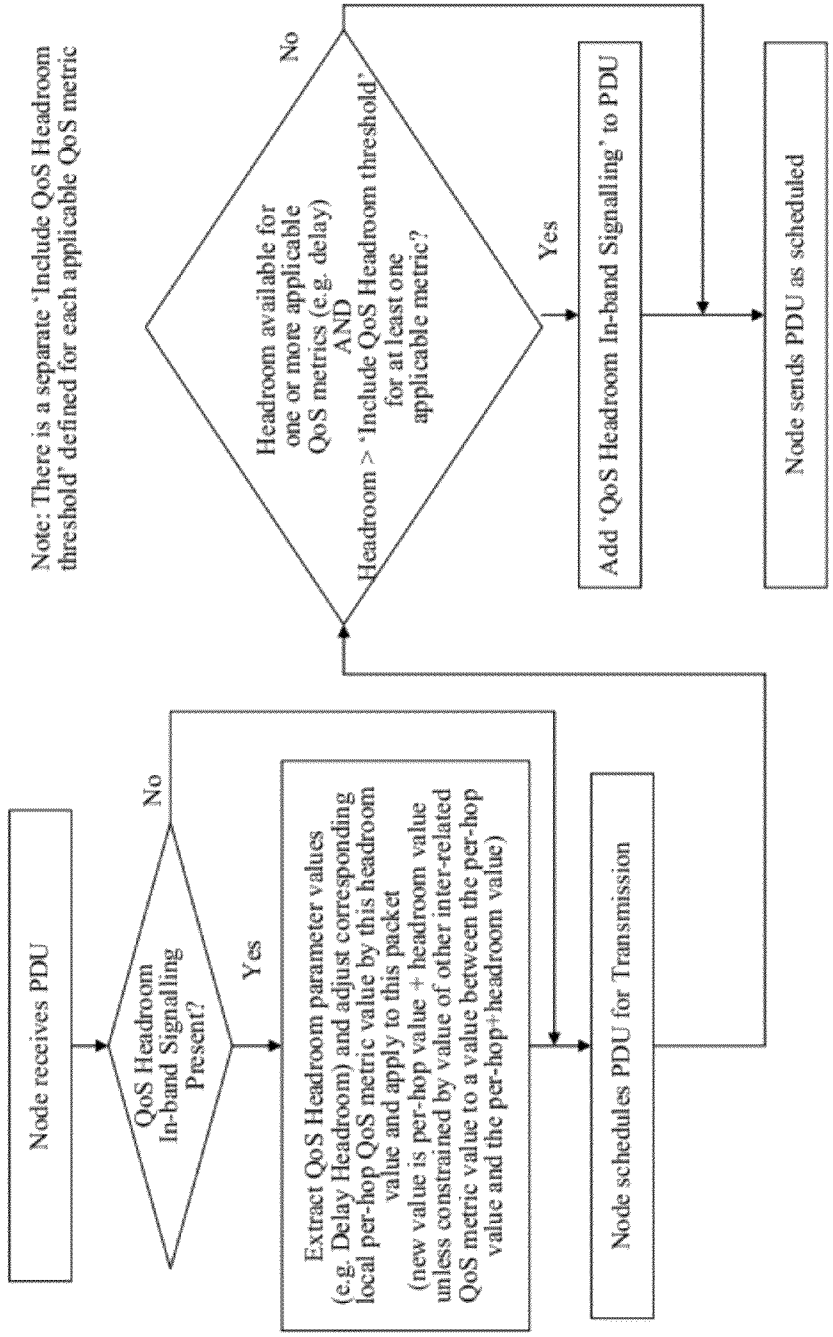
FIG. 5 is a flowchart showing the procedure for processing received QoS Headroom information and the determination of availability of the QoS Headroom to be communicated to the next forwarding node.

FIG. 5 is a flowchart showing the procedure for processing received QoS Headroom information and the determination of availability of the QoS Headroom to be communicated to the next forwarding node.

The table below shows an example of QoS Headroom in-band signaling as an IEEE 802.16 MAC Extended Subheader that may be attached to a MAC PDU.

TABLE

| QoS Headroom extended subheader | | |
|---|---|---|
| Name | Size (byte) | Description |
| Delay Headroom | 1 | Specify any additional allowance of delay for this realy MAC PDU due to |

TABLE-continued

QoS Headroom extended subheader

| Name | Size (byte) | Description |
|---|---|---|
| | | relay MAC PDU being scheduled ahead of its maximum latency at RS or BS further up on the path. In unit of frames |

With respect to the in-band signaling, since the QoS headroom in-band signaling only deals with remainder values, the size of the numeric range can be made smaller than if absolute values were required. Because no in-band signaling is attached if no headroom is available for the next downstream node, this technique can scale well with system utilization. With heavier traffic load, it is less likely there will be remaining headroom available, hence, there will be less signaling overhead due to the presence of the in-band signaling.

The following sections describe application of the above QoS technique in the draft document IEEE 802.16j_D1. Under this draft, when distributed scheduling is used, each RS performs bandwidth allocation of its relay links and access link based on QoS requirements and channel conditions. In IEEE 8072.16j_D1, each RS receives the end-to-end QoS parameters during transport connection set up using DSA-* signaling and receives the update to the parameters using DSC-*. However, the end to end QoS parameters need to be translated into per-hop parameters to allow each RS to schedule effectively to ensure overall QoS performance. One example of this type of parameter is maximum latency, where the allowed latency needs to be subdivided to a number of per-hop latencies. The subdivision should be performed by MR-BS in a centralized fashion based on factors such as topology and loading at each RS. And the per-hop QoS parameters should be sent to each RS along the path during service flow set up or modification (DSA/DSC).

Based on the above described QoS technique, the DSA/DSC messages under IEEE 802.16j_D1 can be modified to accommodate per hop QoS information when distributed scheduling is used. An optional new extended subheader may also be used with Relay MAC PDU to allow upstream RS informing downstream RS of its unused option of delay constraint.

The subdivision of values for per-RS QoS metrics is usually done by a centralized management entity, such as MR-BS or other functional entity, with knowledge of network topology and QoS requirements for traffic traversing the network. When the subdivision of QoS parameters are performed, the RS has to schedule each packets based on the allotted portion of QoS metrics as they are set by MR-BS in DSA/DSC message. However, with the pre-allocation of per-RS QoS metrics, the RS cannot take advantage if other RSs (the upstream ones) do not fully utilize their allocations of the metric (e.g. for a particular packet being sent, one or more RSs may have been able to schedule this packet earlier than their allotted maximum per-RS delay). This inability to use the 'slack' in a QoS metric of another RS along the path doesn't allow the total allowance for the metric along the path to be fully exploited, which can result in loss of capacity along the path.

Therefore, the draft for IEEE 802.16j_D1 can be modified based the present QoS technique to add a per-hop QoS TLV in DSA/DSC message to address the QoS issue in the distributed scheduling in multi-hop paths. The text in section 6.3.14.9 can be modified accordingly to accommodate the addition. As an optional feature, a new extended subheader, QoS Headroom extended subheader, is added to the relay MAC PDU. This is to allow full use of the end to end maximum latency when per-RS maximum latency is set at service flow creation. The QoS Headroom extended subheader can be attached to a relay MAC PDU by a RS or MR-BS to indicate to its downstream RS how much headroom the downstream RS can be added to its maximum latency for scheduling purpose. QoS Headroom extended subheader can be attached to DL relay MAC PDU. The MR-BS and RS may attach that to each relay MAC PDU based on its scheduling result. The use of QoS Headroom extended subheader can support full use of the end to end maximum latency when per-RS latency is set at service flow creation and adaptively adjust to loading changes without needing to re-engineer the per-RS QoS metrics.

The proposed changes to the relevant sections in the draft for IEEE 802.16j_D1 are provided below.

[Insert section 6.3.2.2.7, page 17, line 40]

6.3.2.2.7 Extended Subheader Format

TABLE 27

Description of extended subheaders types (DL)

| Extended subheader type | Name | Extended subheader body size (byte) | Description |
|---|---|---|---|
| 6 | QoS Headroom extended subheader | 1 | See 6.3.2.2.7.9 |
| 7-127 | Reserved | — | — |

[Insert section new 6.3.2.2.7.9, following the above change]

6.3.2.2.7.9 QoS Headroom Extended Subheader

QoS Headroom extended subheader may only be included with relay MAC PDUs. A MR-BS or RS may include a QoS Headroom extended subheader when forwarding a relay MAC PDU. If the extended subheader is included, it shall contain the Delay Headroom for the relay MAC PDU of the MR-BS or RS. The Delay Headroom is defined as the delta between maximum latency at the MR-BS or RS and the actual scheduling delay of the relay MAC PDU. When a RS receives an QoS Headroom extended subheader, it may recalculate the maximum latency for the relay MAC PDU at the RS by adding the entire or partial of delay headroom to the maximum latency of the tunnel. If no QoS Headroom extended subheader is received with a relay MAC PDU, the RS shall assume there is no delay headroom available.

The support of QoS Headroom extended subheader is optional and shall be negotiated between the BS and the MS as part of the registration dialog (REG-REQ/RSP).

TABLE XX

QoS Headroom extended subheader

| Name | Size (byte) | Description |
|---|---|---|
| Delay Headroom | 1 | Specify any additional allowance of delay for this really MAC PDU due to relay MAC PDU being scheduled ahead of its maximum latency at RS or BS further up on the path. In unit of frames |

[Insert the following paragraph to section 6.3.14.9.3.1, page 122, line 55]

6.3.14.9.3.1 SS-Initiated DSA

If the service flow is not mapped to a tunnel, the MR-BS may send a DSA-REQ using the requested service flow parameter to all the RS on the path to obtain admission control decision. The CID in the service flow parameter should be the CID of the individual service flow.

The MR-BS may include Per-RS QoS TLV in DSC-REQ to RS. If RS receives Per-RS QoS TLV, RS shall use values in Per-RS QoS TLV instead of the corresponding ones for the service flow.

[Insert the following paragraph to section 6.3.14.9.4.1, page 123, line 53]

6.3.14.9.4.1 SS-Initiate DSC

In MR network with distributed scheduling, before admitting the changes and sending DSC-RSP to the requesting station which could be an MS or RS, the MR-BS shall send DSC-REQ to all the RSs on the path to request for admission control decisions. The MR-BS may include Per-RS QoS TLV in DSC-REQ to RS. If RS receives Per-RS QoS TLV, RS shall use values in Per-RS QoS TLV instead of the corresponding ones for the service flow. If the service flow is mapped to a tunnel, the CID in the service flow parameter should be the tunnel CID; otherwise, the CID for the service flow is included. Such DSCREQ is first sent from MR-BS to its subordinate RS using its primary management CID.

[Insert the following paragraph to section 6.3.14.9.4.2, page 124, line 31]

6.3.14.9.4.2 BS-Initiated DSC

In MR network with distributed scheduling, before MR-BS sending DSC-REQ to an MS or RS to modify an existing service flow, the MR-BS may first send DSC-REQ to all the RSs on the path to request for admission control decision. The MR-BS may include Per-RS QoS TLV in DSC-REQ to RS. If RS receives Per-RS QoS TLV, RS shall use values in Per-RS QoS TLV instead of the corresponding ones for the service flow. Such DSC-REQ is first sent from MR-BS to its subordinate RS using its primary management CID. If the RS' resource condition cannot support the requested SF parameter, it updates the SF parameter with the one it can support.

[Insert the following section 11.13.38, page 124, line 31]

11.13.38 Per-RS QoS

| Name | Type (1 byte) | Length (1 byte) | Value | Scope |
|---|---|---|---|---|
| Per-RS QoS | TBD | Variable | Compound | DSA-REQ/RSP DSC-REQ/RSP |

The following TLV values shall appear in each Per-RS QoS TLV

| Name | Type (1 byte) | Length (1 byte) | Value |
|---|---|---|---|
| RS Basic CID | TBD | Variable | Compound |
| Maximum Latency for the RS | TBD | 4 | Milliseconds |

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements of the described implementations and other implementations can be made based on what is described and illustrated.

What is claimed is:

1. A method for enhancing quality of service (QoS) in a multi-hop communication network under a distributed scheduling, comprising:
   determining unused portions of per-hop QoS metric values in transmitting data in nodes of a multi-hop path;
   communicating information on unused portions of per-hop QoS metric values in transmitting data obtained at one node to the next downstream node along the multi-hop path;
   allowing at least part of the unused portions of per-hop QoS metric values to be used by the next downstream node in data transmission to enhance QoS in the multi-hop path;
   after a data unit is scheduled for transmission, determining whether an unused portion of a per-hop QoS metric value associated with the data unit is equal to or exceeds a threshold;
   communicating information on the unused portion of the per-hop QoS metric value to the next downstream node when the unused portion of QoS metric value is equal to or exceeds the threshold; and
   operating the next downstream node to add the unused portion of the per-hop QoS metric value received in an in-band signaling from the upstream node to a pre-assigned value for the per-hop QoS metric value to produce a new value for the per-hop QoS metric value.

2. The method as in claim 1, comprising:
   providing an in-band signaling to the next downstream node that contains values of the unused portions of per-hop QoS metrics to communicate the information on the unused portions of per-hop QoS metric values.

3. The method as in claim 1, wherein:
   the per-hop QoS metrics are cumulative along the multi-hop path.

4. The method as in claim 3, wherein:
   the per-hop QoS metrics are delays incurred at nodes.

5. The method as in claim 1, wherein:
   the in-band signaling includes a protocol data unit (PDU) subheader containing the information on the unused portion of the per-hop QoS metric value associated with the data unit before transmission of the data unit to the next downstream node.

6. The method as in claim 5, comprising:
   using the new value for the per-hop QoS metric value to schedule transmission of the associated data unit by the next downstream node to a subsequent downstream node in the multi-hop path.

7. A multi-hop communication network for forwarding data packets under a distributed scheduling, comprising:
   communication nodes linked to forward data packets from one node to another node under a distributed scheduling, wherein each node comprises:
   data queues that receive and store data packets from a upstream node along a multi-hop path, each data queue to process a received data packet to extract information on a unused portion of a per-hop quality of service (QoS) parameter indicating QoS of the multi-hop path;

a data packet scheduler that reads the information on each unused portion of the per-hop QoS parameter, requests link resource for transmission the data packets in the data queues, schedules transmission of the data packets based on availability of the requested link resource and information on unused portions of the per-hop QoS parameter associated with the data packets, a data packet transmitter responsive to a scheduling decision from the data packet scheduler on a schedule for transmission of the data packets in the data queues along the multi-hop path and fetching the data packets from the data queues based on the schedule to transmit the fetched data packets to the next downstream node along the multi-hop path;

wherein the communication nodes are configured to:

after a data unit is scheduled for transmission, determine whether a unused portion of a per-hop QoS metric value associated with the data unit is equal to or exceeds a threshold; and communicate information on the unused portion of the per-hop QoS metric value to the next downstream node when the unused portion of QoS metric value is equal to or exceeds the threshold; and operating the next downstream node to add the unused portion of the per-hop QoS metric value received in an in-band signaling from the upstream node to a pre-assigned value for the per-hop QoS metric value to produce a new value for the per-hop QoS metric value.

8. The network as in claim 7, wherein:
the nodes are base stations and relay stations for wireless communications.

9. The network as in claim 8, wherein:
the nodes are base station and relay stations under IEEE 802.16.

10. The network as in claim 7, wherein:
the nodes are computers or computer servers forming a computer network.

11. The network as in claim 7, wherein:
one of the nodes comprise a link resource allocator that allocates link resource in response to requests from the data packet scheduler for link resource for transmitting the data packets in the data queues to the next downstream node along the multi-hop path.

12. The network as in claim 7, wherein:
the data packet scheduler in one of the nodes requests from another node for link resource for transmitting the data packets in the data queues to the next downstream node along the multi-hop path.

13. A method for enhancing quality of service (QoS) in a multi-hop communication network under a distributed scheduling, comprising:

determining a unused portion of a delay in transmitting each of data packets at nodes of a multi-hop path;

attaching to the data packets information on unused portions of delays in transmitting the data packets obtained at one node to transmit both the data packets and the information on the unused portions of delays to the next downstream node along the multi-hop path;

scheduling transmission of the data packets in the next downstream node further along the multi-hop path based on the unused portions of delays that are respectively associated with the data packets, wherein an amount of delay for transmitting a data packet is extended by a respective received unused portion of delay associated with the data packet;

after a data packet is scheduled for transmission, determining whether a unused portion of delay associated with the data packet is equal to or exceeds a threshold;

communicating information on the unused portion of the delay to the next downstream node when the unused portion of the delay is equal to or exceeds the threshold; and operating the next downstream node to add the unused portion of the delay received in an in-band signaling from the upstream node to a pre-assigned value for the per-hop delay value to produce a new value for the per-hop delay.

14. The method as in claim 13, comprising:
adding the in-band signaling that contains a Protocol Data Unit (PDU) subheader value of the unused portion of delay to an associated data packet to be transmitted to transmit both the in-band signaling and the associated data packet to the next downstream node.

* * * * *